(12) United States Patent
Johnson

(10) Patent No.: US 7,845,899 B2
(45) Date of Patent: Dec. 7, 2010

(54) FLUID POWERED TURBINE ENGINE

(75) Inventor: Bud T. J. Johnson, Calgary (CA)

(73) Assignee: Envision corporation, Belmopan (BZ)

( * ) Notice: Subject to any disclaimer, the term of this patent is extended or adjusted under 35 U.S.C. 154(b) by 362 days.

(21) Appl. No.: 10/596,976

(22) PCT Filed: Dec. 17, 2004

(86) PCT No.: PCT/CA2004/002214

§ 371 (c)(1),
(2), (4) Date: Jun. 30, 2006

(87) PCT Pub. No.: WO2005/064151

PCT Pub. Date: Jul. 14, 2005

(65) Prior Publication Data

US 2006/0291993 A1   Dec. 28, 2006

(30) Foreign Application Priority Data

Dec. 31, 2003   (CA) .................................. 2452967

(51) Int. Cl.
F03B 15/06   (2006.01)

(52) U.S. Cl. ................ 415/4.3; 415/4.5; 415/149.4; 415/211.2; 415/222; 415/906; 290/44; 290/55

(58) Field of Classification Search .............. 415/4.3, 415/4.5, 149.4, 211.2, 220, 222, 906, 908; 290/43, 44, 54, 55
See application file for complete search history.

(56) References Cited

U.S. PATENT DOCUMENTS

| 1,669,055 | A |   | 5/1928  | Hogg |
| 2,017,961 | A |   | 10/1935 | Ferral |
| 2,068,792 | A |   | 1/1937  | Dekker |
| 2,650,752 | A | * | 9/1953  | Hoadley ...................... 415/194 |
| 2,664,961 | A | * | 1/1954  | Goede ......................... 416/207 |
| 3,209,156 | A |   | 9/1965  | Struble |
| 3,228,475 | A |   | 1/1966  | Worthmann |
| 3,339,078 | A | * | 8/1967  | Crompton ................... 415/4.5 |
| 4,021,135 | A |   | 5/1977  | Pedersen et al. |
| 4,070,131 | A |   | 1/1978  | Yen |
| 4,127,356 | A |   | 11/1978 | Murphy |

(Continued)

FOREIGN PATENT DOCUMENTS

BE    567272 A    5/1958

(Continued)

OTHER PUBLICATIONS

International Search Report. International Application No. PCT/CA/2004/002214.

(Continued)

Primary Examiner—Igor Kershteyn
(74) Attorney, Agent, or Firm—Osler, Hoskin & Harcourt LLP

(57) ABSTRACT

A wind turbine engine comprising rotor blades disposed within an outer casing and a half-spherical head located in front of the rotor blades and blocking the inner 50% of the radius of the rotor blades, the casing and head creating an acceleration chamber wherein incoming wind is speeded up and redirected around the head, and the accelerated wind then rotates the wind turbine rotor blades to generate power.

19 Claims, 5 Drawing Sheets

U.S. PATENT DOCUMENTS

| | | | |
|---|---|---|---|
| 4,140,433 A | | 2/1979 | Eckel |
| 4,288,704 A | | 9/1981 | Bosard |
| 4,309,146 A | | 1/1982 | Hein et al. |
| 4,320,304 A | * | 3/1982 | Karlsson et al. ............... 290/55 |
| 4,335,319 A | | 6/1982 | Mettersheimer, Jr. |
| 4,350,900 A | | 9/1982 | Baughman |
| 4,411,588 A | * | 10/1983 | Currah, Jr. .................. 415/220 |
| 4,424,452 A | * | 1/1984 | Francis ........................ 290/55 |
| 4,868,408 A | * | 9/1989 | Hesh ........................... 290/52 |
| 5,038,049 A | | 8/1991 | Kato |
| 5,137,417 A | | 8/1992 | Lund |
| 5,375,968 A | | 12/1994 | Kollitz et al. |
| 5,391,926 A | | 2/1995 | Staley et al. |
| 5,457,346 A | | 10/1995 | Blumberg |
| 5,852,331 A | | 12/1998 | Giorgini |
| 6,132,172 A | | 10/2000 | Li |
| 6,158,953 A | | 12/2000 | Lamont |
| 6,191,496 B1 | | 2/2001 | Elder |
| 6,382,904 B1 | * | 5/2002 | Orlov et al. .................. 415/4.5 |
| 6,538,340 B2 | | 3/2003 | Elder |
| 6,655,907 B2 | | 12/2003 | Brock et al. |
| 6,740,989 B2 | | 5/2004 | Rowe |
| 6,849,964 B2 | | 2/2005 | Becherucci et al. |
| 7,214,029 B2 | * | 5/2007 | Richter ....................... 415/4.5 |
| 2004/0042894 A1 | | 3/2004 | Smith |
| 2008/0166242 A1 | | 7/2008 | Johnson |

FOREIGN PATENT DOCUMENTS

| | | |
|---|---|---|
| DE | 4125691 | 2/1993 |
| DE | 19526718 | 1/1997 |
| FR | 547884 | 12/1922 |
| FR | 2422047 A2 | 11/1979 |
| GB | 545587 A | 6/1942 |
| JP | 360029 | 10/1947 |
| JP | 52009742 | 1/1977 |
| JP | 52043047 | 4/1977 |
| JP | 10089234 | 4/1998 |
| JP | 11173253 | 6/1999 |
| JP | 2001082314 | 3/2001 |
| NZ | 507483 | 3/2002 |
| RU | 2039308 C1 | 7/1995 |
| RU | 2106524 C1 | 3/1998 |
| RU | 2147693 | 4/2000 |
| RU | 2166665 | 5/2001 |
| RU | 2191288 C1 | 10/2002 |
| RU | 12195 | 3/2008 |
| SU | 10199 A1 | 6/1929 |
| SU | 74518 A | 7/1949 |

OTHER PUBLICATIONS

English Language Abstract of DE 4,125,691.
Image Downloaded from http://en.wikipedia.org/wiki/Image:Compr.Assiale.jpg, Flanker, Oct. 11, 2006.
Concise Explanation of the Relevance of Russian Patent No. RU12195 Published on Dec. 16, 1999, Done by Andrei Moskvitch; Montreal, Apr. 20, 1999.
English Abstract of French Patent No. FR2422047, Published on Nov. 2, 1979.
Abstract of Application NZ507483 published on Mar. 28, 2002.
Concise Explanation of the Relevance of French Patent No. FR547884, Published on Oct. 5, 1922, Done by Andrei Moskvitch; Montreal, Apr. 20, 2009.
English Abstract of Russian Patent RU2147693, Published on Apr. 20, 2000.
English Abstract of Russian Patent RU2191288, Published on Oct. 20, 2002.
English Abstract of Russian Patent RU2166665, Published on May 10, 2001.
Concise Explanation of the Relevance of Soviet Union Inventor's Certificate No. SU74518 Published on Jul. 31, 1949, Done by Andrei Moskvitch; Montreal, Apr. 20, 2009.
Concise Explanation of the Relevance of Soviet Union Inventor's Certificate No. SU10199 Published on Apr. 29, 1929, Done by Andrei Moskvitch; Montreal, Apr. 20, 2009.
Concise Explanation of the Relevance of Russian Patent No. RU2106524 Published on Mar. 10, 2009, Done by Andrei Moskvitch; Montreal, Apr. 20, 2009.
Concise Explanation of the Relevance of Russian Patent No. RU2039308 Published on Jul. 9, 1995, Done by Andrei Moskvitch; Montreal 20, 2009.
English abstract of JP 10-089234.
English abstract of JP 2001-082314.
English abstract of JP 11-173253.
English abstract of JP 52-043047.
English abstract of DE 19526718.
English abstract of JP 10-089234, Dec. 9, 1996.
English abstract of JP 2001-082314, Sep. 9, 1999.
English abstract of JP 11-173253, Sep. 12, 1997.
English abstract of JP 52-043047, Sep. 30, 1975.
English abstract of DE 19526718, Jan. 23, 1997.
International Search Report. International Application No. PCT/CA/2004/002214.
English Language Abstract of DE 4,125,691, Apr. 2, 1993.

* cited by examiner

FLUID POWERED TURBINE ENGINE

CROSS-REFERENCE TO RELATED APPLICATIONS

The present application is the U.S. National Stage of International Patent Application No. PCT/CA2004/002214 filed Dec. 17, 2004. Through the '214 application, this application claims the benefit of priority to Canadian Patent Application No. 2,452,967 filed Dec. 31, 2003.

BACKGROUND OF THE INVENTION

The inventor has studied examples of present state of the art wind turbines of the propeller type. It was apparent that certain improvements could be made to harness a higher percentage of energy from a given cross section of wind accessed by their propeller blades. Based on principles of physics and aerodynamics known to the inventor, some serious possibilities and alternatives were apparent. At the present time, there is a growing demand for environmentally clean energy production. Costs of maintenance including the repair of weather damage to suburban and rural electrical distribution systems has reached the point where such systems are no longer profitable. This situation now provides adequate incentive toward the invention and development of more efficient and localized wind power electrical generation in the range of fifty kilowatts to one megawatt.

OBJECTS OF THE INVENTION

The inventor had determined that successful attainment of the following objects would lead to the development of a new type of wind power unit with a very high level of efficiency:

Firstly, to deal with the matter of recovering and harnessing wind energy not being captured by the inner fifty percent of the radius length of propeller blade systems as common to present state of the art wind turbines.

Secondly, to produce a wind power unit to more efficiently harness useable levels of energy from a broader range of wind speeds.

Thirdly, to create a wind power unit capable of recovering a maximum percentage of energy from the wind. In other words, can we build a wind power unit as efficient as steam and gas turbines?

Fourthly, to design and build a wind power unit which presents a lower or much less imposing cross section within its environment, or a combination of both.

BASIC DESCRIPTION AND IMPROVEMENTS OVER PRESENT STATE OF THE ART

Existing propeller turbine wind power units of present state of the art are not harnessing a very high percentage of energy from the cross section of wind addressed by such units. Three bladed propellers do not harness much of that energy. Present state of the art arrangements with larger numbers of blades might present some improvement within the scope of smaller sized systems. The inner 50% of the radius of propeller driven wind power systems is not harnessing much of the cross section of energy being addressed. The most practical solution to dealing with the inner 50% of the radius of propeller blades from their axle center, is to efficiently block off that area, and access the redirected energy with turbine blades extending radially beyond the blocked off area.

This invention, in its presently preferred embodiment, employs a spherical head arrangement, hereinafter referred to as a "speedball" in front of, and covering more than 50% of the radius from axle center to the outer tips of its turbine blades. The speedball increases the velocity of redirected wind energy, to more completely address a larger number of shorter turbine blades.

The amount of wind speed increase as the oncoming wind curves around the half spherical speedball head is theoretically, the equivalent of ¼ of the circumference of the spherical head, over its radius, to its center point, and that figure comes to 1.57 to 1. The significance of this is that available kinetic energy in a moving air mass at a given wind speed is a cubic function. This means that the net wind velocity increase, as recently confirmed by the inventor's engineers is 46%, after deducting drag factors. The resulting increase in available wattage of kinetic energy is 1.46 cubed, or about 311%. The inventor refers to the increase in available energy as "kinetic energy enhancement". Present mathematical formulae for calculating watts per square meter of air in motion uses a standard mass or weight per cubic meter of air at a given altitude and temperature. The entire mathematical formula, to determine available watts per square meter in a moving air mass, as more particularly explained by the American Wind Energy Association, does not deal with compression. The inventor, however, is clearly aware that any compression of the oncoming air mass is going to increase its weight per cubic meter, to provide a further gain in available wattage per square meter, and that further gain would also be a cubic function. An example of the advantage of adding compression, would be where the compression factor would be 25%, increasing available watts per square meter to 1.25 cubed, which totals 1.953. As a consequence, we should have a further 95% as to available wattage per square meter. The inventor also refers to this method of increasing available kinetic energy per square meter as "kinetic energy enhancement".

Present state of the art wind turbine systems tend to be limited as to the range of wind speeds from which they can harness a useful amount of wind energy. The spherical head arrangement increases the speed of the wind redirected from that inner 50% of the center to blade tip radius of the turbine rotor and blade assembly, but the faster moving wind is inclined to address only the inner radial portion of the turbine blades. To even out wind flow through the operating aperture containing the multi-bladed turbine rotor, a compound curved intake scoop arrangement is used to scoop inward a larger volume of incoming wind, toward the said shorter and more numerous turbine blades. This annular ring scoop is further designed with an inner facing airfoil arrangement, which increases the velocity of the captured wind, to much the same extent as that achieved by means of the said spherical head. The overall objective is to increase incoming wind speed, and then have this faster moving wind evenly address the aperture containing the larger number of shorter turbine blades. A further advantage of the said intake scoop, is that it captures an enlarged volume of oncoming wind, thereby creating compression, increasing the mass or weight of the wind column as it addresses the turbine blades, increasing the wattage of kinetic energy addressing the turbine blades. Through the combination of an extended length outer periphery airfoil extending rearward from the front outside edge of the said intake scoop, and an outward expansion proceeding to the rear behind the turbine rotor and blades assembly, a lower pressure or vacuum exhaust situation is achieved.

We now have a wind turbine engine, with supercharging at its intake, higher velocity and compression of wind mass entering the cylindrical encasement of its turbine rotor and blades, and with all of its blades adequately addressed to produce maximum torque.

This is followed by an exhaust area of continuously lowering pressure, behind the turbine rotor and blade assembly. All of the basic attributes of a turbine engine are now present within this embodiment. In the particular case of this wind turbine engine, its turbine blades will have blade pitch control. Where a 3-bladed wind turbine of present state of the art has its blades built to take advantage of aerodynamic lift, the short blades of this wind turbine engine must be shaped to harness more direct torque. Blade pitch control is considered essential in this embodiment, to most efficiently access a full range of wind speeds, as well as being able to set the turbine blades at full open neutral in the case of excessively high wind speeds, and at that point, the blades are then being more directly driven by aerodynamic lift, and continue to produce power. What is now readily apparent, is that with a much higher level of efficiency, we are now dealing with a situation where a wind turbine engine will be rather small in size, against its output potential, compared to wind turbines of present state of the art.

With this invention, we now have a new concept for engineers and other people skilled in the art to work with. A number of improvements will be made, as is usual, to the point where an absolute maximum amount of wind energy will be harnessed by future versions of this invention.

Although this preferred embodiment is primarily meant to serve as a wind energy harnessing device to operate within a range of 50 kilowatts to 1 megawatt, the inventor presently sees its upward range of output potential in the order of 5 megawatts. Those skilled in the art have already expanded three bladed propeller systems to where their largest wind turbines have 2½ megawatts of potential output. Future large versions of the present invention should be able to match that figure, and may ultimately double it.

The inventor anticipates some potential toward the use of special embodiments of this invention in water power and drive applications, and perhaps also with regard to high efficiency air circulating fan systems.

DETAILED DESCRIPTION

FIG. 1 is a partially cut away side view of a preferred embodiment of the invention, as mounted on the rotatable top of its support tower platform, with turbine rotor and twelve turbine blades, and with its wind intake scoop cross section cut away to show the rotor and turbine blades. Other details, being mechanical in nature, would be present state of the art, and do not need to be shown to illustrate the essential principles, details and novelty of the inventive concept.

Figure 5:
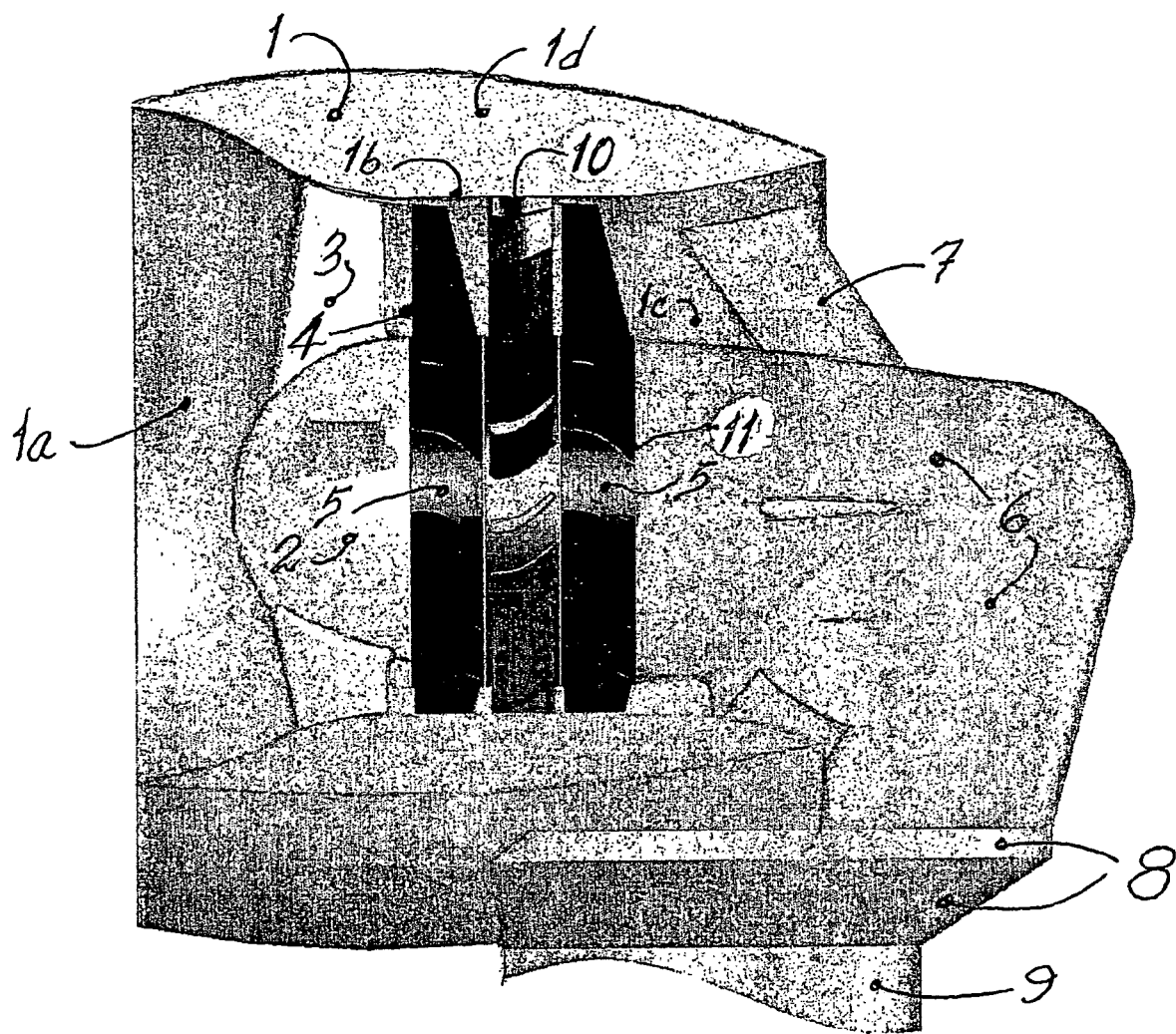

FIG. 5 is a simplified drawing of a three row blade system, as might be applied to the turbine rotor, and within the flow through and turbine drive chamber respectively, with one ring of 12 stabilizer blades being firmly mounted to the inside surface of the flow through and turbine drive chamber closely between two wind driven rows of turbine blades, as mounted and affixed to a single turbine rotor. The stabilizer blades serve to dampen or smooth out turbulence, and can enhance efficiency, when properly shaped and engineered.

Figure 1:
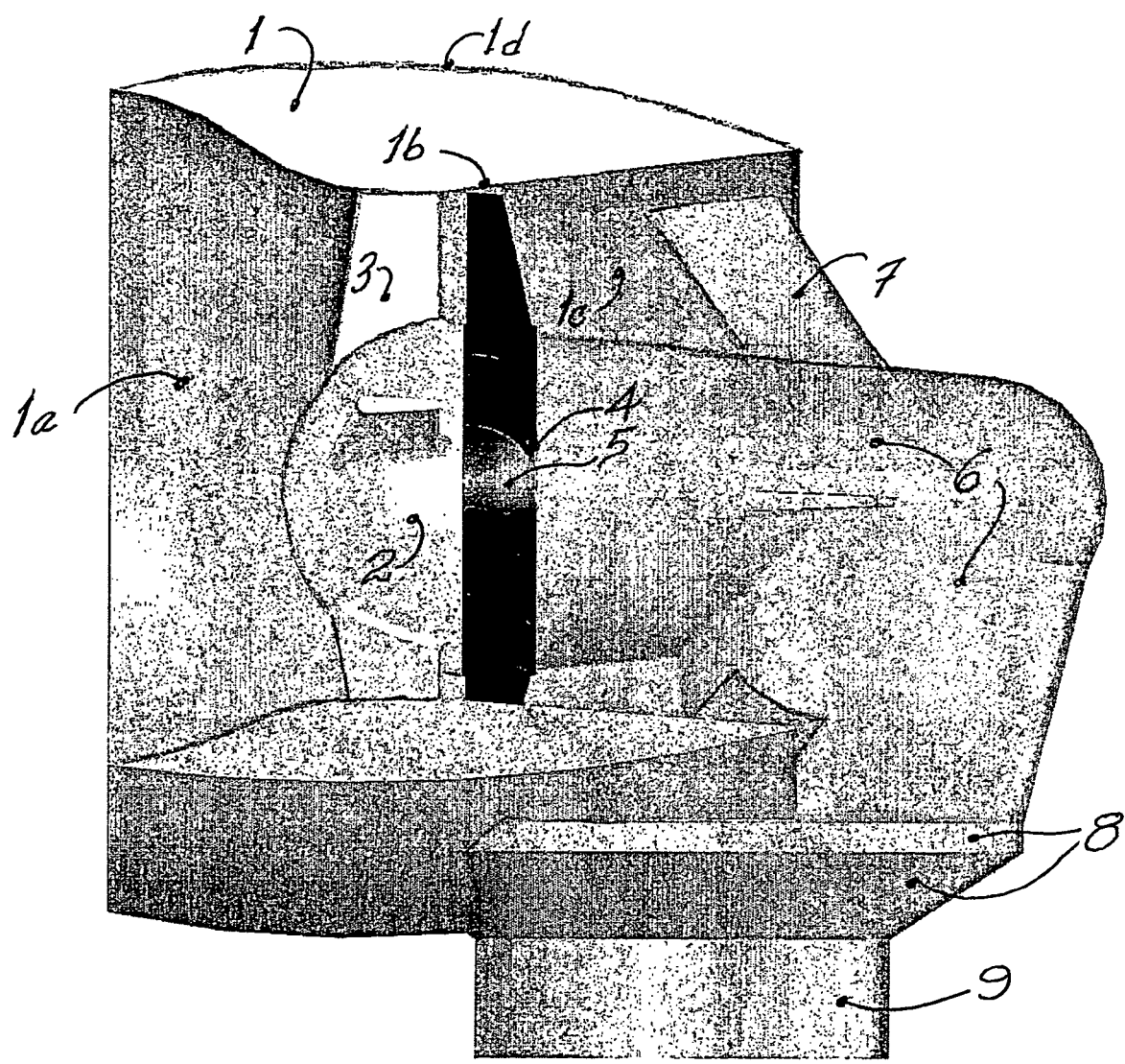

With all of the foregoing in view, and such other and further purposes, advantages or novel features as may become apparent from consideration of this disclosure and specification, the present invention consists of the inventive concept which is comprised, embodied, embraced or included in various specific embodiments of such concept, reference being made to the accompanying figures, in which:

FIG. 1 is a partially cut away side view of a preferred embodiment of the invention, as mounted on the rotatable top of its support tower platform, where we have wind intake scoop and flow through encasement assembly 1, embodying s-curve velocity increasing surface 1a, flow through and turbine drive chamber area surface 1b, rearward expanding exhaust channel surface 1c, and outer airfoil curved surface 1d, to provide converging airflow to augment exhaust induction. Then we have half sphere wind displacement and velocity head 2, radially mounted airfoiled front end structural support members 3, for wind intake scoop and flow through encasement assembly 1, and also supporting the front end of encased axle/driveshaft (not shown), then we have turbine blades 4, as mounted on turbine rotor 5, then we have encasement body 6, for axle/driveshaft, mechanicals and electrical generator components, followed by rear structural support and reinforcement members 7, rotatable support table 8, for the entire wind turbine engine, along with its encasement and structural supports, which is mounted onto, and collared into the top end of support tower 9.

As a functional explanation, with recommendations toward achieving best wind turbine engine performance, we now refer to wind intake scoop and flow through encasement assembly 1, where its velocity increasing s-curved frontally projecting inner facing surface 1a, is designed to provide essentially the same amount of velocity increase to incoming wind, as provided by wind displacement and velocity head 2. The inner facing surface of wind intake scoop and flow through encasement assembly 1, and the outer diameter of wind displacement and velocity head 2, can be spaced apart, or separated to an ideal level, where a tolerable amount of compression of the incoming wind mass is achieved, without seriously slowing down the said incoming wind mass. This is important, as there will be a balancing point of radial length of that separation distance, between achieving the most compression, limiting throughput wind speed reduction, or ultimately spilling off some of the incoming wind mass. Turbine blades 4, may not be able to handle an over compressed air mass fast enough, to maintain the smoothness of flow essential to greatest energy capture levels by means of the said turbine blades 4. Best available energy gain ratios provided by velocity increase and compression would not be achieved without the above described balancing procedure being carefully applied, with the best ratio assuring highest energy capture levels over a broad range of wind speed.

A further comment is also in order, where the wind turbine engine's turbine blades would be placed, contained and addressed within the outer 50% of the radius from axle centre to those blade tips. That could change somewhat, related to the foregoing balancing procedure. A properly balanced system of intake volume, velocity increase, and compression, is the most important consideration, and will harness the most energy per square meter.

Figure 2:
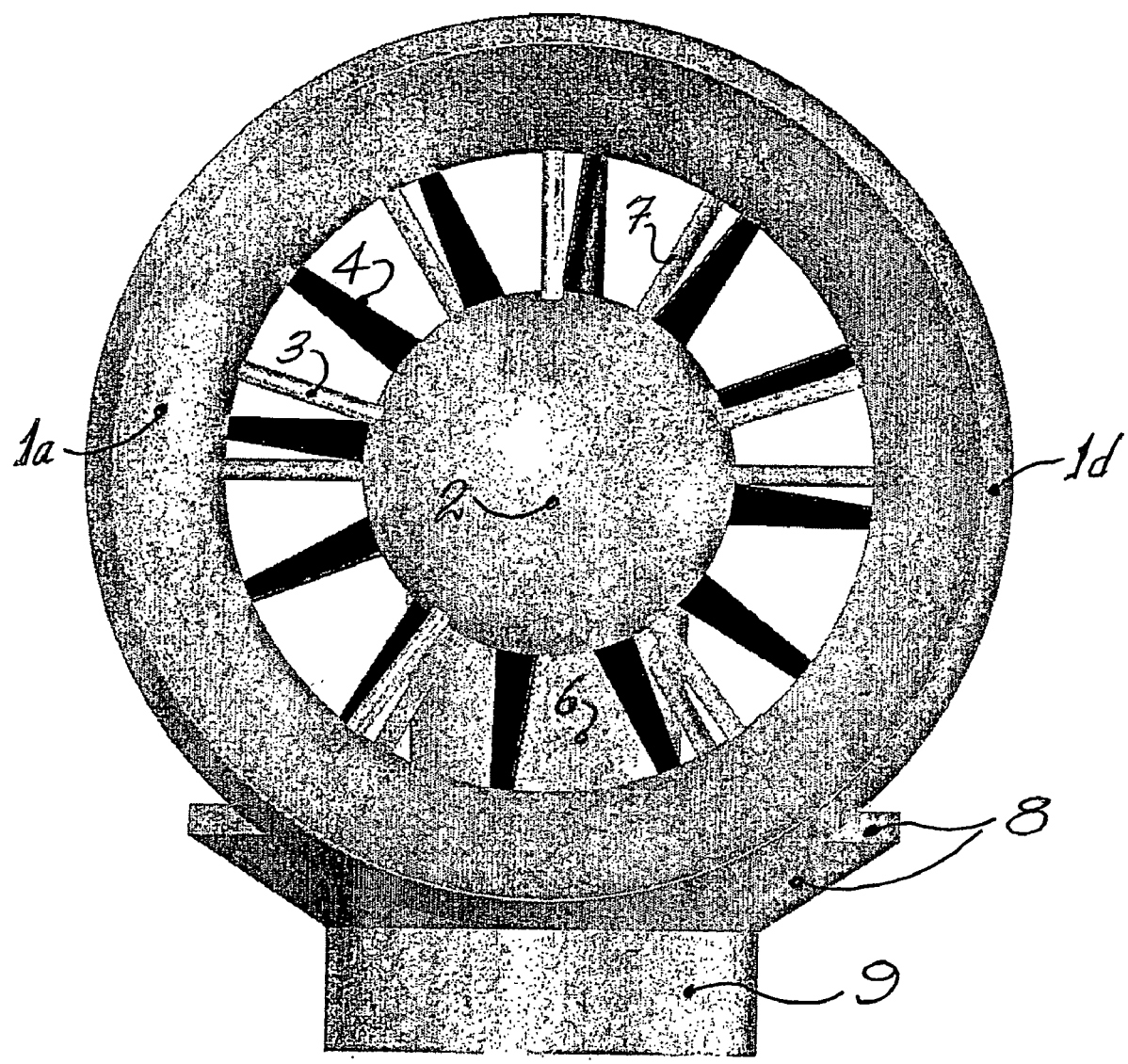
FIG. 2 is a frontal view of the same wind turbine engine embodiment, as mounted on its rotatable tower top, illustrating its wind capture area, wind intake scoop, turbine blades, and airfoil covered support and reinforcement members for the wind intake scoop and internalized axle and drive system.

FIG. 2 is a frontal view of the same wind turbine engine embodiment, where we have an unobstructed direct frontal view of wind intake scoop and flow through encasement assembly features, being s-curved intake scoop surface(s) 1*a*, and outer airfoil surface 1*d*, then speedball wind displacement and velocity head 2, front end structural support and reinforcement members 3, turbine blades 4, encasement body 6, rotatable support table 8, and the stationary top end of support tower 9.

What we are seeing here is quite similar to the frontal view of a jet turbine engine as one might observe on large passenger jet aircraft.

Figure 3:
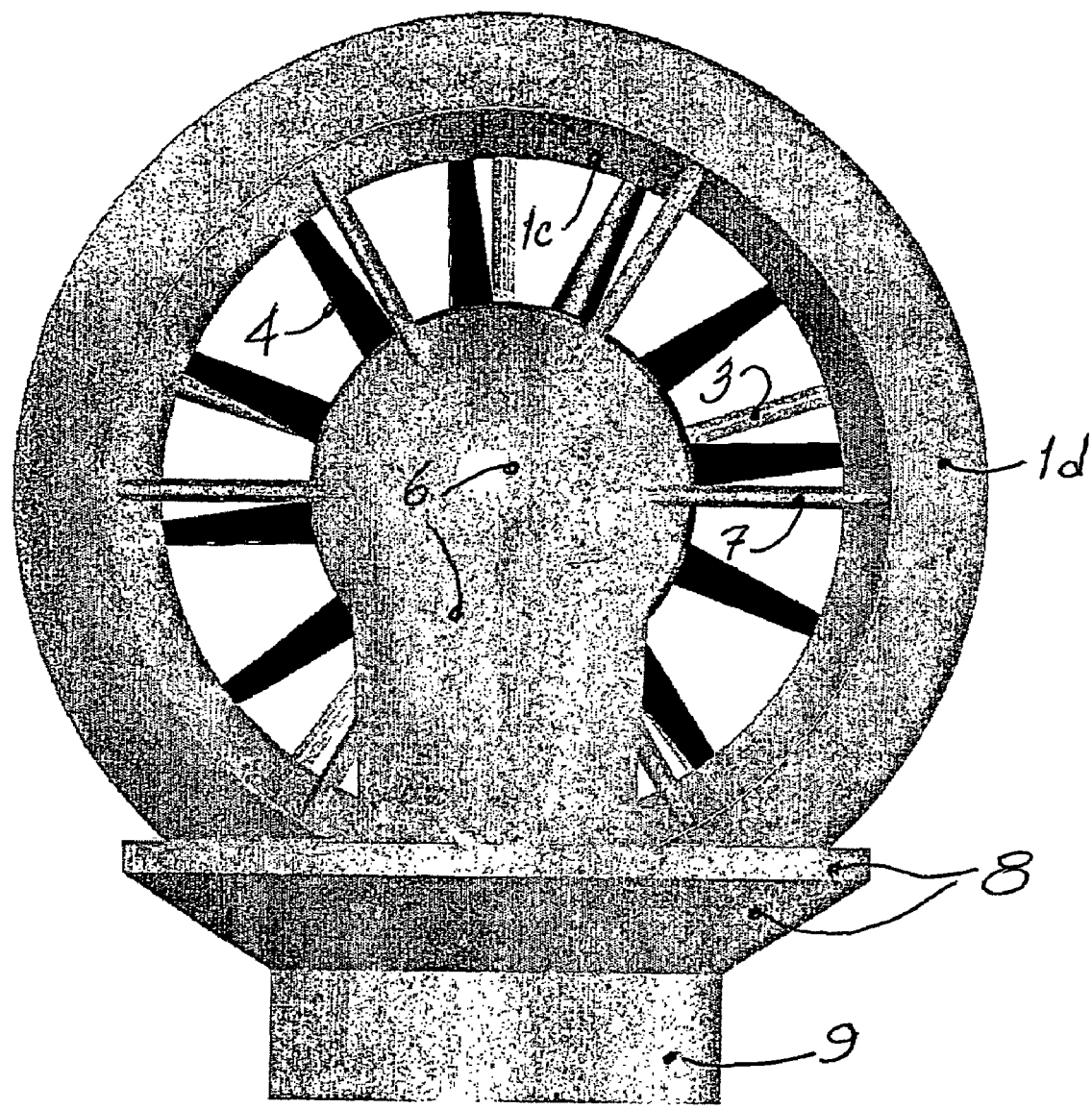
FIG. 3 is a rear view of the same wind turbine engine on top of its tower mounting, as it would look directly from the rear.

FIG. 3 is a rear view of the same wind turbine engine embodiment, Where we have an unobstructed direct rear view of wind intake scoop and flow through encasement assembly features, being internalized rearward expanding exhaust channel surface 1*c*, and outer airfoil surface 1*d*, then we have front end structural support members 3, turbine blades 4, encasement body 6, rear structural support members 7, rotatable support table 8, as mounted on the top end of support tower 9.

Figure 4:
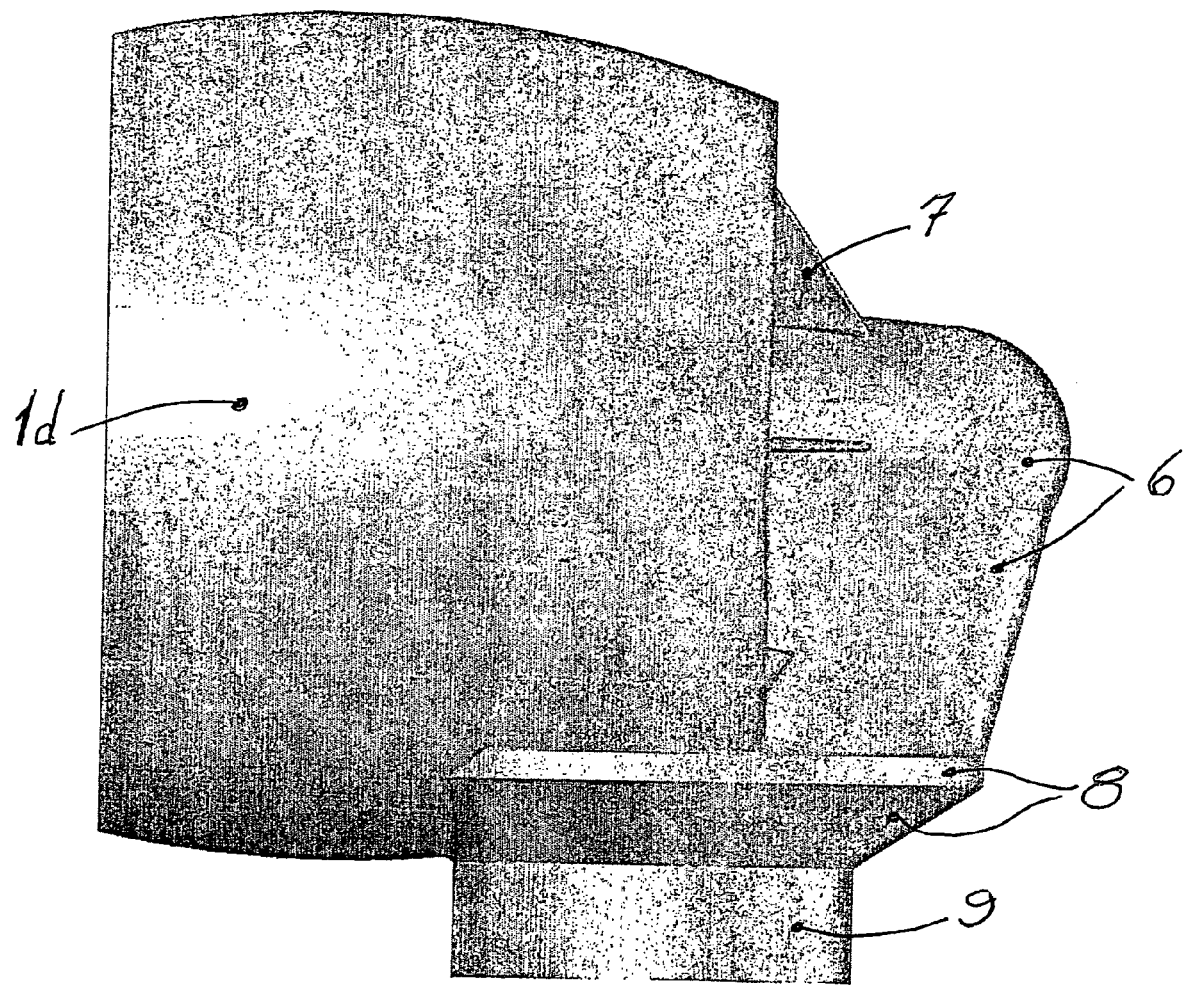
FIG. 4 is a side view of the wind turbine engine, on top of its tower mounting, as it would look directly from the side, (similar in appearance to a jet turbine engine) mostly enshrouded, or encapsulated by the extended airfoil shape of its wind intake scoop and flow through encasement assembly.

FIG. 4 is an unobstructed side view of the wind turbine engine, where we have wind intake scoop and flow through encasement assembly outer airfoil surface 1*d*, encasement body 6, rear structural support members 7, then rotatable support table 8, as mounted on the top end of support tower 9.

FIG. 5 is a partially cut away side view of a second preferred embodiment of the invention, with two rows of twelve turbine rotor blades 4, and 11, mounted on its rearward extended drive rotor 5, where the said two rows of turbine blades are spaced some distance apart on the said rearward extended drive rotor 5, to properly position a fixed stationary non-rotating ring assembly of twelve flow stabilizer blades 10, with adequate clearance between said stabilizer blades assembly 10, and the two rows of turbine blades 4, and 11, and the said non-rotating ring of twelve flow stabilizer blades is affixed or solidly mounted to the inner circumference of extended flow through and turbine drive area surface 1*b*. All other elements not essential to the placement of the two rows of turbine blades 4 and 11, with flow stabilizer blades 10, placed between the said two rows of turbine blades, on rearward extended rotor 5, are completely numbered, described and explained in FIGS. 1, 2 and 3 respectively.

What is claimed is:

1. A fluid turbine, comprising:
   a rotor and blade assembly, including:
   a rotor, the rotor being rotatable about a rotation axis;
   a plurality of blades, each of the blades having a tip, the blade tips defining a blade tip radius with respect to the rotation axis;
   a fluid displacement head arrangement blocking off at least 50% of the blade tip radius from the rotation axis towards the blade tips, the fluid displacement head arrangement shaped to redirect blocked-off fluid towards the blades extending radially beyond a blocked-off area; and
   a single annular fluid intake scoop and flow through encasement assembly surrounding the rotor and blade assembly, the encasement assembly having an interior surface and an exterior surface, the exterior surface of the encasement assembly being shaped to form an fluid-foil, so as to provide converging fluid flow for augmenting exhaust from the turbine;
   wherein fluid flowing through the encasement assembly enters the encasement assembly solely through one central opening formed between the interior surface of the encasement assembly and the rotor and blade assembly.

2. The fluid turbine of claim 1, wherein the interior surface of the encasement assembly has a fluid velocity increasing surface forward of the blades, the fluid velocity increasing surface being shaped to increase the velocity of fluid entering the turbine.

3. The fluid turbine of claim 2, wherein the fluid velocity increasing surface is S-shaped.

4. The fluid turbine of claim 3, wherein the interior surface of the encasement assembly has an expanding exhaust channel surface rearward of the blades.

5. The fluid turbine of claim 1, wherein the interior surface of the encasement assembly has an expanding exhaust channel surface rearward of the blades.

6. The fluid turbine of claim 1, wherein the fluid displacement head arrangement is, at least in part, spherical.

7. The fluid turbine of claim 2, wherein the fluid displacement head arrangement is, at least in part, spherical.

8. The fluid turbine of claim 3, wherein the fluid displacement head arrangement is, at least in part, spherical.

9. The fluid turbine of claim 5, wherein the fluid displacement head arrangement is, at least in part, spherical.

10. The fluid turbine of claim 1, wherein each of the blades has a controllable blade pitch.

11. The fluid turbine of claim 1, further comprising a rotatable support constructed and arranged to permit the fluid turbine to be rotatably supported on a support tower.

12. The fluid turbine of claim 1, wherein the blades are in two spaced-apart rows.

13. The fluid turbine of claim 12, further comprising a plurality of flow stabilizers in between the rows of blades.

14. The fluid turbine of claim 1, wherein the fluid turbine is a wind turbine.

15. The fluid turbine of claim 1, wherein the fluid turbine is a water turbine.

16. The fluid turbine of claim 2, wherein the interior surface of the encasement assembly has an expanding exhaust channel surface rearward of the blades.

17. The fluid turbine of claim 1, wherein
   the fluid displacement head arrangement is, at least in part, spherical; and
   the interior surface of the encasement assembly has an expanding exhaust channel surface rearward of the blades and an S-shaped fluid velocity increasing surface forward of the blades being shaped to increase the velocity of fluid entering the turbine.

18. The fluid turbine of claim 2, wherein the fluid displacement head arrangement and the velocity increasing surface forward of the blades are positioned with respect to each other so as to compress fluid flowing through the encasement assembly forward of the blades.

19. The fluid turbine of claim 7, wherein the fluid displacement head arrangement and the velocity increasing surface forward of the blades are positioned with respect to each other so as to compress fluid flowing through the encasement assembly forward of the blades.

* * * * *